SAUNDERS & BISSETT.
Car Wheel.
No. 4,673.
Patented July 28, 1846.
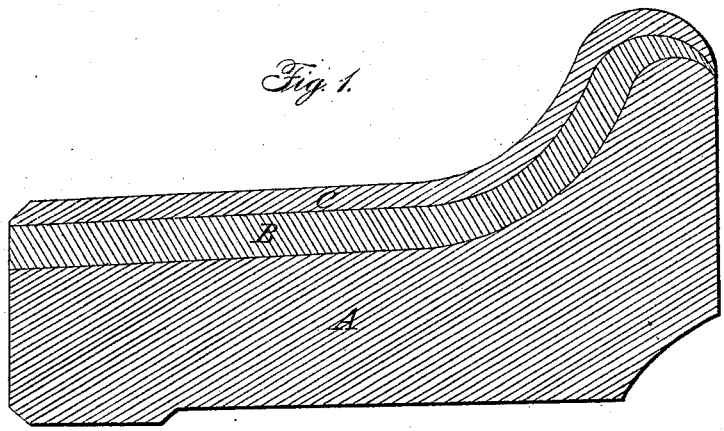
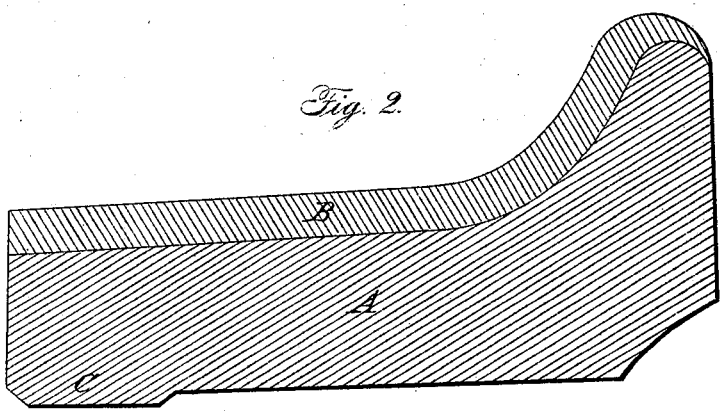
Inventor,
David Saunders
James George Bissett
Samuel Saunders

UNITED STATES PATENT OFFICE.

DAVID SAUNDERS, OF CINCINNATI, OHIO, JAMES G. BISSETT, OF COVINGTON, KENTUCKY, AND SAMUEL SAUNDERS, OF PITTSBURGH, PENNSYLVANIA.

MANUFACTURE OF TIRES FOR CAR-WHEELS.

Specification of Letters Patent No. 4,673, dated July 28, 1846.

*To all whom it may concern:*

Be it known that we, DAVID SAUNDERS, of Cincinnati, Ohio, JAMES GEORGE BISSETT, of Covington, Kentucky, and SAMUEL SAUNDERS, of Pittsburgh, Pennsylvania, have invented a new and useful Mode or Way for Manufacturing Tires for Railroad-Wheels; and we do hereby declare that the following is a full and exact description of the process.

A pile of iron and steel is made as follows: first a large bar of iron, then a thin bar of steel, then another bar of iron, the latter being thin, and serving only as a protection to the steel from being burned in the process of welding, the whole is then welded under a hammer. The bar is then passed through a series of rollers, giving the required shape to the tire as shown in the accompanying drawing marked Figure 1; in which A, is the large bar of iron, B, the bar of steel, and C, the thin bar of iron, which serves as a protection to the steel in the process of welding, and is then turned off. This bar is bent to the required shape, welded, and shrunk on the nave of the railroad wheel and forms the tire. The wheel is then placed in a lathe and the thin bar of iron turned off; leaving the steel to form the face and flange of the wheel which comes in contact with the rails of the road.

Fig. 2 is a section of the tire when completed, in which A, is the iron, B, the steel and C, a projection to prevent the tire from slipping inwardly on the nave of the wheel, and in addition to which the tire may be riveted to the nave or not as may be desired.

What we claim as our invention and wish to secure by Letters Patent, is—

The manufacturing tires for railroad wheels, as herein described.

DAVID SAUNDERS.
JAMES GEORGE BISSETT.
SAMUEL SAUNDERS.

Witnesses:
   H. DANIELS,
   CHARLES C. TAYLER,
   THOMAS STEEL.